United States Patent [19]
Gopal et al.

[11] Patent Number: 4,885,780
[45] Date of Patent: Dec. 5, 1989

[54] METHOD FOR CALL ROUTING IN A NETWORK

[75] Inventors: Gita Gopal, Wayne; Abel Weinrib, Randolph, both of N.J.

[73] Assignee: Bell Communications Research, Inc., Livingston, N.J.

[21] Appl. No.: 219,139

[22] Filed: Jul. 15, 1988

[51] Int. Cl.$^4$ .............................................. H04M 7/00
[52] U.S. Cl. .................................... 379/221; 379/209
[58] Field of Search ................. 379/220, 221, 209, 219

[56] References Cited

U.S. PATENT DOCUMENTS 4,163,124  7/1979  Jolissaint .............................. 379/220

OTHER PUBLICATIONS

"Design and Optimization of Networks with Dynamic Routing", G. R. Ash et al., The Bell System Technical Journal, vol. 60, No. 8. pp. 1788–1820, Oct. 1981.
"Use of a Trunk Status Map for Real Time DNHR", G. R. Ash, Proc. Eleventh Int. Teletraffic Congress, Kyoto, pp. 795–801, Sep. 1985.
"Stablization of Alternate Routing Networks", R. S. Krupp, IEEE International Communications Conference, Philadelphia, pp. 31.2.1–31.2.5. 1982.
"On a Delay-Loss System for Overload Protection", R. G. Scehrer, Tenth International Teletraffic Congress Montreal, Session 5.2, paper #8, 1983.
"Performance Evaluation of Private Networks with Automatic Route Selection and Call Queuing," A. Girard et al., Proc. Eleventh International Teletraffic Congress, Kyoto, Session 2.1, paper #4, 1985.

Primary Examiner—James L. Dwyer
Attorney, Agent, or Firm—James W. Falk

[57] ABSTRACT

A method for setting up calls in a telecommunications network is disclosed. A call arrives at originating switch A for destination switch B. An attempt is made at switch A to allocate a trunk from the direct trunk group between A and B. If a trunk is available the call is set up. If a trunk is not available (i.e. the trunk group is completely busy) the call is queued for up to Tq seconds to wait for a trunk in the direct trunk group to be released. If a trunk is released, the queue is served in first-come, first-served order, i.e. the call at the head of the queue is set up. When a call has waited in the queue for Tq seconds without obtaining a direct trunk, an attempt is made at switch A to set up the call on an alternate route. The inventive call set-up method provides for operation of a network in which delay is traded off for reduced blocking probability or to carry a relatively small number of customer-specified high priority calls with almost zero blocking probability.

23 Claims, 3 Drawing Sheets

DATA FOR EACH TRUNK GROUP

PRIORITY QUEUE ENTRY

METHOD FOR CALL ROUTING IN A NETWORK

FIELD OF THE INVENTION

The present invention relates to a method for setting up calls in a telecommunications network in which increased set-up delay is traded off for lower blocking probability.

BACKGROUND OF THE INVENTION

As the hardware used for call set-up in a telecommunications network (e.g. processors and control channels) becomes more powerful, the call set-up procedure can be made ever faster. However, as long as the calls are being set-up for human users, shortening the call set-up delay below a few seconds becomes unobservable and irrelevant to the user. It is an object of the present invention to use this extra time available for call set-up to run the network more efficiently. Use of this extra time allows for decreased blocking of calls and increased flexibility in network operations, at the cost of only slight changes in call set-up procedures.

SUMMARY OF THE INVENTION

In accordance with the present invention, the extra time available for call set-up is used to give extra priority to a preferred route for a call. Thus, a call request is queued until a preferred route for the call becomes available or until a predetermined time interval Tq runs out. It is only after the expiration of the interval Tq that a call is allowed to try for non-preferred routes. Typically, the preferred route for a call is the direct route. However, a multi-hop route may be the preferred route if the direct route does not exist or for some other reason related to network engineering. When the preferred route for the call is the direct route, the non-preferred routes are multi-hop routes.

Illustratively, consider the case where the preferred route is the direct route. A call request arrives at originating switch A for destination switch B. An attempt is made at switch A to allocate to the call a trunk from the trunk group directly connecting switches A and B. If a trunk in the direct trunk group is available, the call is set up. If a trunk is not available, i.e., the trunk group directly connecting switches A and B is completely busy, the call is queued for up to Tq seconds, to wait for a trunk in the direct trunk group to be released. If a trunk is released, the queue is served in first-come, first-served order, i.e., the call at the head of the queue is set up. When a call has waited in the queue for Tq seconds without obtaining a trunk from the direct trunk group, an attempt is made at switch A to set up the call (which is now an "overflow" call) on an alternate (i.e. non-preferred) route. To find an alternate route, a standard technique such as Dynamical Non-Hierarchical Routing (DNHR) (see, e.g. G. R. Ash et al., "Design and Optimization of Networks With Dynamic Routing", *Bell System Technical Journal*, Vol. 60 pp. 1787–1820, October 1981) may be used in which various potential alternate routes are searched in a pre-specified order based on traffic forecasts. Instead of DNHR a technique known as Trunk Status Map Routing (TSMR) (see, e.g. G. R. Ash "Use of a Trunk Status Map for Real Time DNHR", Proc. Eleventh Int. Teletraffic Congress, Kyoto, September 1985) may be used to specify the order in which potential non-direct routes are considered for an overflow call.

An overflow call that is attempting to obtain trunks for a non-direct route is not allowed to queue. Thus, an overflow call will get a trunk from a trunk group only if there is a free trunk and there are no direct calls waiting in the queue for that trunk group. The overflow call will be set up if it can obtain trunks on all necessary hops of some alternate route. If some trunk is not available to complete a particular alternate route, a try is made for the next alternate route in sequence until all possibilities are exhausted.

The inventive call set-up method provides for operations of a network in which relatively unnoticeable delay in call set-up is traded off for substantially reduced blocking probability. For example, in the 38 node "Chicago Network", under conditions of a twenty percent overload and a three-minute average trunk holding time per call, the blocking probability is reduced from between 10 and 11% to between 5 and 6% when calls are queued to wait for the direct route for a period of up to five seconds. The "Chicago Network" is a well studied model network which simulates a portion of the telephone network in the Chicago, Ill. area.

The call set-up method of the present invention may be contrasted with prior art call set-up methods. In a conventional call set-up method, such as DNHR, there is no queuing of call requests in order to obtain a direct route for the call. Instead, when a call request arrives, various possible routes are searched in a prespecified order based on traffic forecasts.

Prior work on giving higher priority to preferred routes is based on trunk reservation (see, e.g. R. S. Krupp, "Stabilization of Alternate Routing Networks", IEEE International Communications Conference, Philadelphia 1982). With trunk reservation, some capacity is reserved. This capacity can only be used by preferred calls. Overflow calls, for example multi-hop calls in some systems, cannot use this capacity even if the trunks are idle. The queuing approach of the present invention is more adaptive since an overflow call gets to use a trunk group if it has available trunks and if the associated queue is empty. Under these circumstances the probability of an overflow (e.g. a multi-hop) call blocking a direct call is small since no direct call has arrived in the past Tq seconds without obtaining a trunk.

Other work on queuing for trunks (see, e.g. R. G. Schehrer, "On a Delay-Loss System for Overload Protection", Tenth International Teletraffic Congress, Montreal 1983) involves protecting the high priority calls by applying a trunk reservation restriction to the low priority calls, and then queuing the low priority calls which are not carried. In contrast, in the call set-up approach of the present invention, call requests are first queued for the preferred (e.g. the direct) route, and only after a call request is queued for a certain period, is an attempt made to carry a call on a less attractive alternate route.

In a further prior art approach, all calls are queued after they fail to obtain a route using DNHR (see e.g. Girard et al. "Performance Evaluation of Private Networks With Automatic Route Selection and Call Queuing", Proc. Eleventh International Teletraffic Congress, Kyoto 1985). In the present invention, calls are queued for the preferred (e.g. direct) route first, and only after a predetermined interval are attempts made to carry calls on non-preferred (e.g. non-direct) routes. If the call still has not obtained resources, it is blocked.

DETAILED DESCRIPTION OF THE INVENTION

Figure 1:
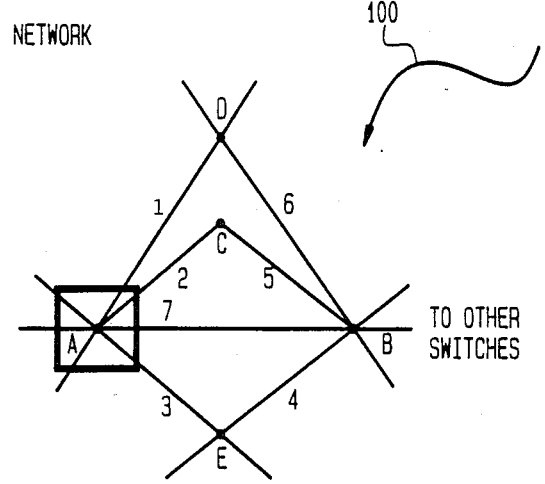
FIG. 1 schematically illustrates a portion of a telecommunications network which sets up calls in accordance with the present invention.

FIG. 1 schematically illustrates a portion of a telecommunications network 100. The network 100 comprises switch nodes A, B, C, D, E which switch nodes are interconnected by trunk groups 1, 2, 3, 4, 5, 6, 7.

Figure 2:
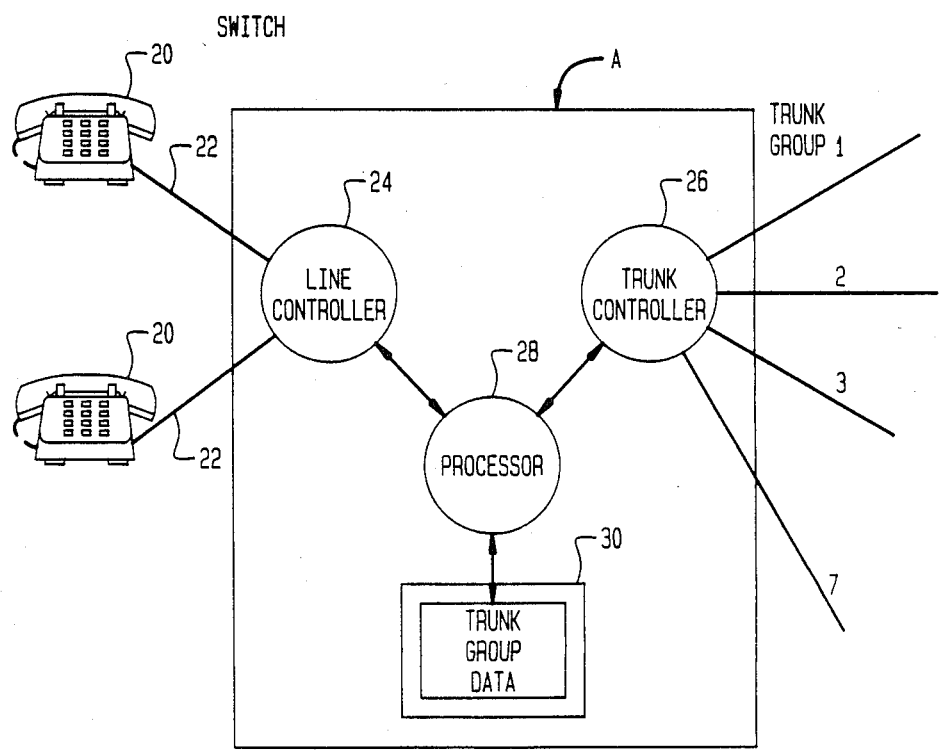
FIG. 2 schematically illustrates a switch node of the network of FIG. 1.

The switch node A is shown in greater detail in FIG. 2. Customer premises equipment such as telephones 20 are connected to the switch A via subscriber lines 22. The subscriber lines are terminated in the switch A by the line controller 24. Thus, call set-up requests are received in the switch A from the customer premises equipment by the line controller 24. As is shown in both FIGS. 1 and 2, the switch A terminates trunk groups 1, 2, 3, and 7. These trunk groups are terminated in the switch A by the trunk controller 26. The processor 28 is connected to both the line controller 24 and the trunk controller 26. The processor is also connected to a memory device 30 which stores data concerning the trunk groups 1, 2, 3, and 7.

Figure 3:
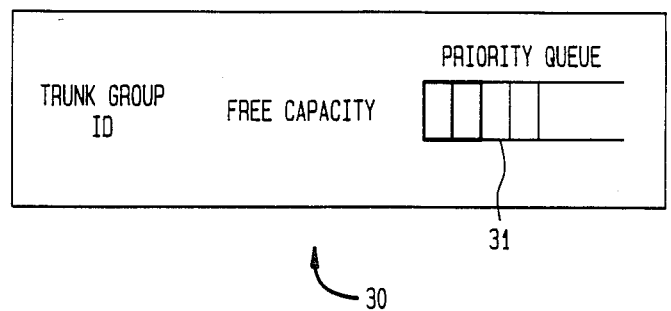
FIG. 3 schematically illustrates the information stored for each trunk group associated with the switch node of FIG. 2.
Figure 4:
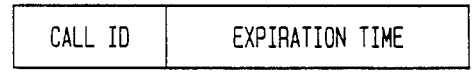
FIG. 4 schematically illustrates a priority queue entry for the switch node of FIG. 2.

The data stored in the memory device 30 for each trunk group 1, 2, 3, and 7 is schematically illustrated in FIG. 3. The data for each trunk group comprises the trunk group identification, the trunk group free capacity and a priority queue 31 for call requests waiting to obtain a trunk in the trunk group. Illustratively, the preferred route for a call is the direct route. In this case, the queue associated with each trunk group stores only call requests for which the trunk group is the direct route. As shown in FIG. 4, each queue entry comprises a call identification and an expiration time. When a call request first enters a queue, the expiration time is set equal to current time plus Tq, where Tq is the maximum time period a call request is queued. If a call does not seize a trunk in the trunk group before the expiration time ends, it is removed from the queue.

When the preferred route for a call is the direct route, a call may be set-up as follows. Illustratively, a call request arrives at originating switch A for destination switch B (see FIG. 1). The processor 28 in switch A (see FIG. 2) attempts to allocate a trunk from trunk group 7 which is the direct trunk group between switch A and switch B. If a trunk from trunk group 7 is available, the call is set up. If a trunk in trunk group 7 is not available, i.e. trunk group 7 is completely busy, then the call request is stored in the priority queue 31 associated with trunk group 7 (see FIGS. 2, 3, and 4) for a maximal period of Tq seconds waiting for a trunk in trunk group 7 to become available. If a trunk in trunk group 7 is released, the queue 31 is served in first-come, first-served order, i.e. the call at the head of the queue is set-up. When the call has waited in the queue 31 for Tq seconds without obtaining the direct trunk group 7, the processor 28 in switch A attempts to set-up the call (which is now an overflow call) on an alternate, non-direct route to the destination switch B, e.g., through the switches C or D. A variety of routing techniques may be used to choose the alternate route such as Dynamic Non-Hierarchical Routing (DNHR) and Trunk Status Map Routing (TSMR). An overflow call that is attempting to obtain trunks of an alternate route is not allowed to queue. Thus, an overflow call will get a trunk from a trunk group only if there is a free trunk and there are no direct calls waiting in the queue for that trunk group. An overflow call will be set up if it can obtain trunks on all hops of some alternate route. If capacity on some trunk group is not available to complete a particular alternate route, the processor at the originating switch will try for another alternate route until all possibilities are exhausted.

In accordance with an illustrative embodiment of the present invention, direct calls are queued because it is better for the overall network performance for them to get through. Overflow calls (e.g. two-hop calls) are not queued because it is less valuable for the overall network performance to route a particular call on a multi-hop route which utilizes several trunk groups. When the network load is low it is acceptable to use non-direct routes, but as the load increases multi-hop routes become less attractive because each multi-hop route may block several direct calls in the future. From the point of view of overall network performance direct calls can be considered high priority calls since they keep the network in a better state. Two-hop or other multi-hop calls may be considered as low priority calls.

In some situations, the preferred route for a call is not the direct route. For example, there may not be a direct physical route between an originating switch node and a destination switch node. In this case logical connectivity may be used. With logical connectivity, at least some of the trunk groups comprising the preferred route from the originating switch node to the destination switch node are under the control of the originating switch node. Thus, from a network control point of view, there is a direct "logical" trunk group between the originating switch node and the destination switch node, even though this direct "logical" trunk group comprises a plurality of "physical" trunk groups. Calls may be queued at the originating switch node of a direct "logical" trunk group for intervals of up to Tq seconds in the same manner as calls may be queued for direct physical trunk groups. If a direct "logical" trunk group is not available within the interval Tq, a call may be routed using an alternate route.

The present invention allows for operation of a network in which delay is traded off for lower blocking probability. Thus, in accordance with the present invention, a call is guaranteed a lower blocking probability if the call can tolerate longer set-up delay in order to wait for a direct trunk. Even rather small additional set-up delays on the order of a few seconds can provide significantly reduced blocking probabilities.

Figure 5:
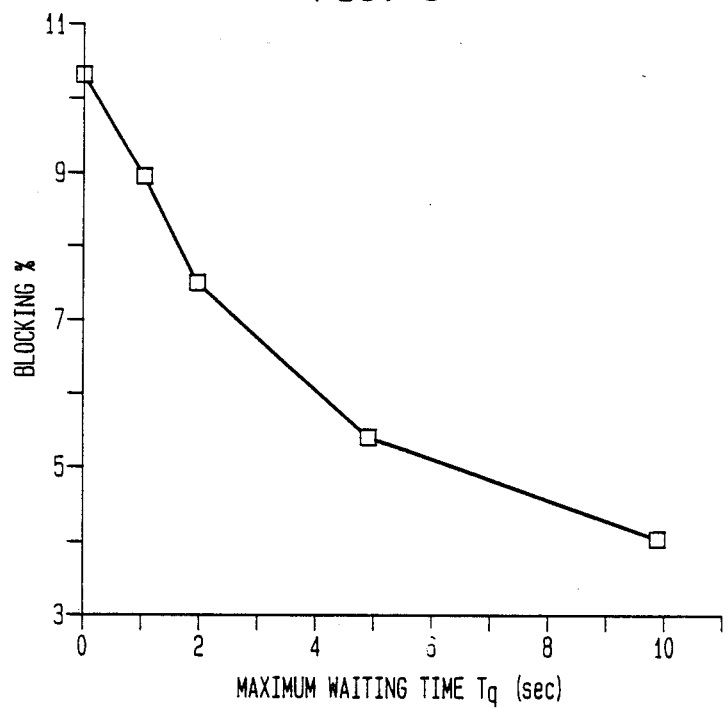
FIG. 5 is a plot of the blocking probability versus queuing time, for the "Chicago Network"

FIG. 5 is a plot of blocking probability versus maximum queuing time (i.e. Tq) for the 38-node "Chicago network". The "Chicago network" is a well studied model network which simulates a portion of the actual public telephone network in the Chicago, Ill. area. Under conditions of a load that is 20% over the design load and assuming that holding time (i.e. duration) of the average call is 3 minutes, it can be seen from FIG. 5, that the blocking probability goes down by about one-half when calls are queued for up to 5 sec. to wait for direct trunks.

In another aspect of the present invention, the queuing of call set-up requests can be utilized to give a relatively small number of customer specified high priority calls almost zero blocking probability. There are a number of possible call set-up methods for such customer specified high priority calls. One possibility is to queue the customer specified priority calls for only a preferred route such as a "logical" or physical direct route. More particularly, if the direct route for a customer specified priority call is available immediately, it is seized. Otherwise, the call is entered in the queue for the direct route where it remains until it is served, or times out and is blocked or tried on overflow routes. Typically, the queue is served on a first-in, first-out basis. Another possibility is to enter the high priority call request into the queues associated with the trunk groups comprising all potential routes for the call, if no route is immediately available. More particularly, if a route is available immediately for a high priority call, it is seized. Otherwise, the priority call is entered in the queue for every trunk group of interest. Illustratively, the queues are served on a first-in, first-out basis. The call will remain for a maximum period Tq in these queues and grab a trunk from each trunk group as it becomes free. As soon as enough trunks are available to set up a complete path to the destination, the call is removed from the remaining queues and any unnecessary trunks are released. This strategy can be used to give a few calls almost zero blocking probability. Either strategy for routing customer specified high priority calls may be combined with a strategy for routing non-priority calls such as DNHR which involves no queuing.

Figure 6:
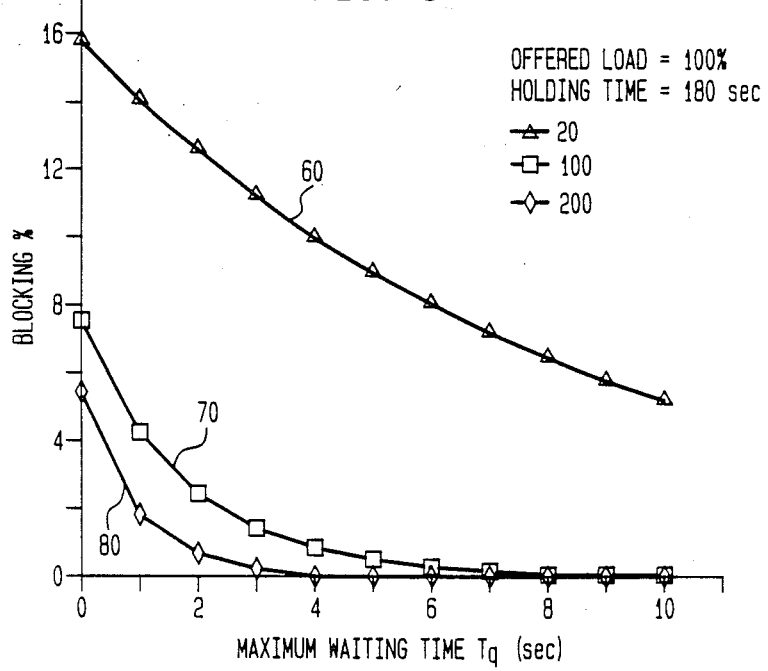
FIG. 6 is a plot of blocking probability versus maximum waiting time for a call for a single trunk group for various trunk group sizes.

The benefit of queuing customer specified priority calls is illustrated in FIG. 6. In FIG. 6, blocking probability is plotted versus maximum waiting time for a single trunk group. Curves 60, 70, and 80 correspond to a trunk group of 20, 100, and 200 trunks respectively. In the case when the offered load is 100% of the trunk group carrying capacity and the average call holding time is 180 sec, FIG. 6 shows that the blocking probability of customer-specified high priority calls drops considerably when these small number of customer-specified high priority calls queue for the direct route for periods (Tq) of about 5 sec. As shown by curves 70 and 80, when the trunk group has 100-200 trunks the blocking probability exponentially approaches zero with a Tq of 6-8 seconds.

Finally, the above described embodiments of the invention are intended to be illustrative only. Numerous alternative embodiments may be derived by those skilled in the art without departing from the spirit and scope of the following claims.

What is claimed is:

1. A method of setting up a call route between an originating node and a destination node in a network comprising a plurality of nodes, said method comprising:
   receiving a request for said call at said originating node,
   determining if a preferred route between said originating node and said destination node is immediately available,
   if said preferred route for said call is available, seizing said preferred route for said call,
   if said preferred route is unavailable, queuing said call for up to a predetermined queuing time,
   if said preferred route becomes available for said call within said queuing time, seizing said preferred route for said call, and
   if said preferred route does not become available within said queuing time, searching for an alternate, non-preferred route for said call.
   wherein said preferred route is a direct route between said originating and destination nodes and said alternate non-preferred route is a non-direct, multi-hop route.

2. The method of claim 1 wherein said direct route is a physical direct route.

3. The method of claim 1 wherein said direct route is a logical direct route.

4. The method of claim 1 wherein said alternate route is chosen by searching a pre-specified list of possible routes for an available alternate route.

5. The method of claim 1 wherein said call is not permitted to queue for a path connecting two of said nodes and comprising part of an alternate, non-direct route for said call.

6. The method of claim 1 wherein said preferred route becomes available for said call within said queuing time when there is available transmission capacity over said preferred route and there are no other calls in said queue having a higher priority.

7. A method of setting up a call route between an originating node and a destination node in a network comprising a plurality of nodes, said method comprising:
   receiving a request for said call at said originating node,
   determining if a preferred route between said originating node and said destination node is immediately available,
   if said preferred route for said call is available, seizing said preferred route for said call,
   if said preferred route is unavailable, queuing said call for up to a predetermined queuing time,
   if said preferred route becomes available for said call within said queuing time, seizing said preferred route for said call, and
   if said preferred route does not become available within said queuing time, searching for an alternate, non-preferred route for said call,
   wherein said alternate route is chosen using Dynamic Non-Hierarchical Routing (DNHR).

8. A method of setting up a call route between an originating node and a destination node in a network comprising a plurality of nodes, said method comprising:
   receiving a request for said call at said originating node,
   determining if a preferred route between said originating node and said destination node is immediately available,
   if said preferred route for said call is available, seizing said preferred route for said call,
   if said preferred route is unavailable, queuing said call for up to a predetermined queuing time, if said preferred route becomes available for said call within said queuing time, seizing said preferred route for said call, and if said preferred route does not become available within said queuing time, searching for an alternate, non-preferred route for said call, wherein said alternate route is chosen using Trunk Status Map Routing (TSMR).

9. A method for setting up a call between an originating switch and a destination switch in a network comprising a plurality of switches interconnected by trunk groups each including a plurality of trunks, said method comprising:

determining if a trunk in the trunk group directly connecting said originating switch and said destination switch is available, if a trunk in said direct trunk group is available, seizing an available trunk in said direct trunk group for said call, if no trunk in said direct trunk group is available, storing said call in a queue at said originating switch for a time not exceeding a preselected queuing time, if a trunk in said direct trunk group becomes available for said call within said queuing time, seizing said trunk for said call, if a trunk in said direct trunk group does not become available for said call within said queuing time, searching for an alternate, non-direct route for said call.

10. The method of claim 9 wherein said queue is served on a first-in, first-out basis and a trunk in said direct trunk group is available for said call when a trunk in said direct trunk group is free and there are no other calls ahead of said call in said queue.

11. A method for setting up calls in a network comprising a plurality of interconnected nodes, said method comprising the steps of:

determining if a preferred route for each of said calls is available.

utilizing the preferred route if it is available for a call, if a preferred route for a call is unavailable, queuing the call in a queue for a period not to exceed a preselected queuing time, serving queued calls on a first-in, first-out basis to enable at least some of the queued calls to utilize a preferred route, and if a queued call is not served within said preselected time, searching for an alternate non-preferred route, wherein said preferred route is a direct route and said alternate, non-preferred route is a multi-hop route.

12. A method for setting up calls in a network comprising a plurality of interconnected nodes, said method comprising the steps of:

determining if a preferred route for each of said calls is available.

utilizing the preferred route if it is available for a call, if a preferred route for a call is unavailable, queuing the call in a queue for a period not to exceed a preselected queuing time, serving queued calls on a first-in, first-out basis to enable at least some of the queued calls to utilize a preferred route, and if a queued call is not served within said preselected time, searching for an alternate non-preferred route, wherein said preferred route is a physical direct route or a logical direct route.

13. A method for setting up calls in a network, said network comprising a plurality of switching nodes interconnected by trunk groups each including a plurality of trunks, each of said switching nodes including a queue for each of the trunk groups associated therewith, said method comprising the steps of determining if a trunk in a direct trunk group is available for each of said calls, utilizing a trunk in the direct trunk group if such a trunk is available for a call, if no trunk in the direct trunk group is available for a call, queuing the call for a time not to exceed a predetermined queuing time in the queue associated with the direct trunk group, serving said queues on a first-in, first-out basis to provide queued calls with trunks in the direct trunk group for each call, and if a queued call is not provided with a trunk group in the appropriate direct trunk group after being queued for said preselected time, searching for an alternate non-direct route comprising multiple trunk groups.

14. A method for setting up a relatively small number of high priority calls in a network to reduce the blocking probability for said high priority calls, said network comprising a plurality of switching nodes interconnected by trunk groups each including a plurality of trunks, each of said switching nodes including a queue for each of the trunk groups associated therewith, said method comprising:

determining if a trunk in a direct trunk group for each of said high priority calls is available and if a trunk in the direct trunk group is available, utilizing the trunk to route the call, if the direct trunk group is unavailable for a high priority call, queuing the high priority call in the queue associated with the direct trunk group, serving the queue to allocate trunks in the direct trunk group, and routing non-priority calls in said network without utilizing said queues.

15. The method of claim 14 wherein said high priority calls are queued for a time period not exceeding a predetermined time period.

16. A method for setting up a relatively small number of high priority calls in a network to reduce the blocking probability for said high priority calls, said network comprising a plurality of switching nodes interconnected by trunk groups each including a plurality of trunks, each of said switching nodes including a queue for each of the trunk groups associated therewith, said method comprising:

seizing a route for each high priority call if the trunk groups comprising such a route are immediately available, if no route is immediately available, entering each high priority call in the queues associated with the trunk groups necessary to set up a plurality of alternate routes for each high priority call, serving said queues to permit queued calls to seize trunks from said associated trunk groups, each call being able to seize trunks until a complete route to its destination is set up at which time the call is removed from any remaining queues and any unnecessarily seized trunks are released, and setting up routes for non-high-priority calls in said network without utilizing said queues.

17. The method of claim 16 wherein said high priority calls are maintained in said queues for a period not to exceed a preselected queuing period.

18. The method of claim 16 wherein each high priority call is entered in the queues necessary to set-up all possible routes for the call.

19. A method for setting up a relatively small number of customer specified high priority calls in a network to reduce the blocking probability for said high priority calls, said network comprising a plurality of switching nodes interconnected by trunk groups each including a plurality of trunks, each of said switching nodes including a queue for each of the trunk groups associated therewith, said method comprising:
  seizing a route for each high priority call, if the trunk groups comprising such a route are immediately available,
  if no such route is immediately available, entering each high priority call in the queues associated with the trunk groups necessary to set up a plurality of alternate routes, said high priority calls to remain in said queues for a time period not to exceed a predetermined time period, and
  serving said queues on a first-in, first-out basis to permit queued calls to seize trunks from said associated trunk groups, each call being able to seize trunks until a complete route to its destination is setup at which time the call is removed from any remaining queues and any unnecessarily seized trunks are released.

20. A method for setting up a relatively small number of high priority calls in a network to reduce the blocking probability for said high priority calls, said network comprising a plurality of switching nodes interconnected by trunk groups each including a plurality of trunks, each of said switching nodes including a queue for each of the trunk groups associated therewith, said method comprising:
  determining if a trunk in a direct trunk group for each of said high priority calls is available and if a trunk in the direct trunk group is available for a high priority call, utilizing the trunk to route the call,
  if the direct trunk group is unavailable for a high priority call, queuing the high priority call in the queue associated with the direct trunk group for a time interval not to exceed a predetermined time interval, and
  serving said queue on a first-in, first-out basis to allocate trunks in the direct trunk group.

21. A method of setting up a call route between an originating node and a destination node in a network comprising a plurality of nodes, said method comprising:
  receiving a request for said call at said originating node,
  determining if a preferred route between said originating node and said destination node is immediately available,
  if said preferred route for said call is available, seizing said preferred route for said call,
  if said preferred route is unavailable, queuing said call for up to a predetermined queuing time,
  if said preferred route becomes available for said call within said queuing time, seizing said preferred route for said call, and
  if said preferred route does not become available within said queuing time, searching for an alternate, non-preferred route for said call,
  wherein said preferred route is a multi-hop route including at least one intermediate node between said originating node and said destination node.

22. A method for setting up calls in a network comprising a plurality of interconnected nodes, said method comprising the steps of:
  determining if a preferred route for each of said calls is available,
  utilizing the preferred route if it is available for a call,
  if a preferred route for a call is unavailable, queuing the call in a queue for a period not to exceed a preselected queuing time,
  serving queued calls on a first-in, first-out basis to enable at least some of the queued calls to utilize a preferred route, and
  if a queued call is not served within said preselected time, searching for an alternate non-preferred route,
  wherein the preferred route for at least some of said calls is a multi-hop route including at least one intermediate node between an originating node and a destination node.

23. The method of claim 22 wherein said preferred route for at least some of said calls is a physical direct route or a logical direct route.

* * * * *